(12) United States Patent
Grenville et al.

(10) Patent No.: US 8,153,180 B2
(45) Date of Patent: Apr. 10, 2012

(54) METHOD AND APPARATUS FOR MAKING BEVERAGES

(75) Inventors: Richard K. Grenville, Wilmington, DE (US); Eric G. Sumner, Wilmington, DE (US); Babatunde Aremu, Stratford, CT (US); Todd A. Katz, White Plains, NY (US); Kathleen Da Cunha, Ridgefield, CT (US)

(73) Assignees: PepsiCo, Inc., Purchase, NY (US); E.I. Du Pont De Nemours And Company, Wilmington, DE (US)

( * ) Notice: Subject to any disclaimer, the term of this patent is extended or adjusted under 35 U.S.C. 154(b) by 768 days.

(21) Appl. No.: 11/219,926

(22) Filed: Sep. 6, 2005

(65) Prior Publication Data

US 2007/0054026 A1    Mar. 8, 2007

(51) Int. Cl.
*A23L 2/52* (2006.01)

(52) U.S. Cl. ........ 426/602; 426/519; 426/520; 426/590; 426/654

(58) Field of Classification Search .................. 426/590, 426/602, 519, 520, 654
See application file for complete search history.

(56) References Cited

U.S. PATENT DOCUMENTS

| | | | |
|---|---|---|---|
| 4,411,771 A | 10/1983 | Bambrick et al. | |
| 4,595,131 A | 6/1986 | Ruskin et al. | |
| 4,596,136 A | 6/1986 | Zacharias | |
| 4,911,770 A * | 3/1990 | Oliver et al. | 149/109.6 |
| 5,580,593 A * | 12/1996 | Liu et al. | 426/96 |
| 5,616,358 A | 4/1997 | Taylor et al. | |
| 5,624,698 A | 4/1997 | Dake et al. | |
| 5,792,502 A | 8/1998 | Montezinos | |
| 5,919,512 A | 7/1999 | Montezinos | |
| 6,068,670 A | 5/2000 | Haupais et al. | |
| 6,345,907 B1 | 2/2002 | Akay et al. | |
| 6,395,316 B1 | 5/2002 | Leas et al. | |
| 6,506,832 B1 | 1/2003 | Derian et al. | |
| 6,550,960 B2 | 4/2003 | Catalfamo et al. | |
| 6,677,387 B2 | 1/2004 | Gurfinkel Castillo et al. | |
| 6,706,288 B2 | 3/2004 | Gustavsson et al. | |
| 6,752,529 B2 | 6/2004 | Holl | |
| 6,835,405 B2 * | 12/2004 | Merkt et al. | 426/590 |
| 2003/0021874 A1 | 1/2003 | Nunes et al. | |
| 2003/0134017 A1 | 7/2003 | Graumlich et al. | |
| 2003/0180371 A1 | 9/2003 | Reslow et al. | |
| 2003/0211167 A1 | 11/2003 | Gustavsson et al. | |
| 2004/0026319 A1 | 2/2004 | Chattopadhyay | |
| 2004/0037161 A1 | 2/2004 | Honda et al. | |
| 2004/0043043 A1 * | 3/2004 | Schlyter et al. | 424/400 |

(Continued)

FOREIGN PATENT DOCUMENTS

CN    1207651    2/1999

(Continued)

OTHER PUBLICATIONS

International Search Report, Oct. 27, 2006.

(Continued)

*Primary Examiner* — Helen F Heggestad
(74) *Attorney, Agent, or Firm* — Banner & Witcoff, Ltd.

(57) ABSTRACT

A process for making stable and uniformly dispersed oil-in-water beverage emulsions is provided. The process comprises combining an oil mixture and an aqueous mixture to form a beverage pre-emulsion; in-line mixing of the beverage pre-emulsion; and homogenizing of the beverage pre-emulsion to form a stable and uniformly dispersed beverage emulsion.

10 Claims, 5 Drawing Sheets

U.S. PATENT DOCUMENTS

| | | | |
|---|---|---|---|
| 2004/0062845 | A1 | 4/2004 | Krawczyk et al. |
| 2004/0071781 | A1 | 4/2004 | Chattopadhyay et al. |
| 2004/0115281 | A1 | 6/2004 | Gustavsson et al. |
| 2004/0156911 | A1 | 8/2004 | Chattopadhyay |
| 2004/0160855 | A1 | 8/2004 | Rivolta et al. |
| 2004/0197469 | A1 | 10/2004 | Lyons et al. |
| 2004/0218469 | A1 | 11/2004 | Unterlander et al. |
| 2004/0249105 | A1 | 12/2004 | Nolte et al. |
| 2005/0082701 | A1 | 4/2005 | Shekunov et al. |
| 2005/0106304 | A1 | 5/2005 | Cook et al. |
| 2005/0244565 | A1* | 11/2005 | Tobolewska et al. ......... 426/605 |

FOREIGN PATENT DOCUMENTS

| | | |
|---|---|---|
| EP | 0117118 | 8/1984 |
| JP | 5293378 | 11/1993 |
| JP | 08-170084 | 7/1996 |
| JP | 8509611 | 10/1996 |
| JP | 10-510317 | 10/1998 |
| JP | 11-501221 | 2/1999 |
| JP | 11-501222 | 2/1999 |
| JP | 2003125744 | 10/2001 |
| JP | 2003-1080 | 1/2003 |
| JP | 2003001080 | 1/2003 |
| JP | 2003-093001 | 4/2003 |
| JP | 2003125744 | 5/2003 |
| JP | 2004-283715 | 10/2004 |
| WO | 9625858 | 8/1996 |
| WO | 97/03576 | 2/1997 |
| WO | 9721359 | 6/1997 |
| WO | 9721360 | 6/1997 |
| WO | 2004010796 | 2/2004 |
| WO | 2006090110 | 8/2006 |
| WO | 9424887 | 7/2010 |

OTHER PUBLICATIONS

Japanese Patent Application No. 2006-241201, Office Action, dated May 24, 2010—(w/English Translation).

Chinese Patent Application No. 200610064250.7, Office Action, dated May 21, 2010—(w/English Translation).

Office Action for corresponding Japanese Patent Application 2009-193974 mailed Feb. 8, 2011.

Office Action for corresponding Chinese Patent Application 200610064250.7 mailed Jan. 19, 2011.

Inner Mongolia Light Industry Science Institute et al, "Daily Technology", China Light Industry Press, 1998-207, Jul. 31, 1998.

Office Action for corresponding Canadian Patent Application 2,558,687 mailed Mar. 1, 2011.

JDMIX, Inc. "Product Applications", 2003-2008, <http://www.jdmix.com/apps.html>.

Middleman, S., Drop Size Distributions Produced by Turbulent Flow of Immiscible Fluids through a Static Mixer, Ind. Eng. Chem., Process Des. Develop., 1974, pp. 78-83, vol. 12, No. 1, USA.

Al Taweel, A.M. et al, Liquid Dispersion in Static In-Line Mixers, Can. J. Chem. Eng., Aug. 1983, pp. 527-533 vol. 61, Canada.

Streiff F.A. et al., New Fundamentals for Liquid-Liquid Dispersions Using Static Mixers, Récents Progrès en Génie des Procédés, 1995, pp. 307-314, vol. 11, No. 51 ed. Lavoisier, Paris, France.

LeGrand, J. et al., Liquid-Liquid Dispersion in an SMX-Sulzer Static Mixer, Nov. 2001, pp. 949-956 Trans IChemE, vol. 79, Part A, UK.

Chen, S.J. et al., Gas-Liquid and Liquid-Liquid Dispersions in a Kenics Mixer, 71st Annual AIChE Meeting, 1978, USA.

Edited by Paul, Edward et al., Handbook of Industrial Mixing, 2004, John Wiley & Sons; USA.

Nechaev, "Mayonnaise", cited by examiner in the Notification of the Patent Office of Russia, pp. 44-46, dated Aug. 6, 2008 (Examiner's explanation attached).

Foods & Drinks, website: http://www.fnd.com.ua/archiv/4_2003/2003/05/18/aromaticheskie_emul_23.html. (Examiner's explanation attached).

* cited by examiner

METHOD AND APPARATUS FOR MAKING BEVERAGES

FIELD OF THE INVENTION

The present invention relates to a process of making stable and uniformly dispersed oil-in-water beverage emulsions. More particularly, the present invention relates to using certain types of mixing devices and substantially reducing the need for homogenizers in the production of such beverage emulsions.

BACKGROUND OF THE INVENTION

Oil-in-water emulsions can be desirable for many end uses, for example, beverages and in chemical compositions, such as those applied to substrates to impart certain properties. Well-known oil-in-water chemical compositions include paints, inks, varnishes, and the like. Compositions which provide oil- and water-repellency to surfaces are also chemical oil-in-water emulsions.

For beverages, an oil-in-water emulsion must meet the quality standards demanded by consumers. The quality of the beverage in aspects such as appearance, taste, and mouth feel is affected by the stability of the emulsion in the beverage in addition to the dispersion of the emulsion within the beverage. A high quality beverage is one that is free of neck ringing or floc in the bottle and that does not separate during normal storage and transportation conditions before it is consumed.

A need exists for a process of making oil-in-water beverage emulsions that are stable and uniformly dispersed and that avoids neck ringing or floc when stored in a bottle.

SUMMARY OF THE INVENTION

According to the present invention, a process for making a stable oil-in-water emulsion is provided. In general, the process comprises combining an oil component and an aqueous component to form a pre-emulsion. The oil component comprises an oil-miscible component and an oil and the aqueous component comprises water. Thereafter, the process comprises mixing the pre-emulsion to reduce the droplet size of the oil component and homogenizing the pre-emulsion after the mixing to form a uniformly dispersed emulsion.

In one embodiment of the present invention, the process comprises combining an oil mixture and an aqueous mixture to form a beverage pre-emulsion. The oil mixture comprises an oil and the aqueous mixture comprises a beverage emulsifier and water. Thereafter, the process includes in-line mixing the beverage pre-emulsion to reduce the droplet size of the oil and homogenizing the beverage pre-emulsion after the in-line mixing to form a uniformly dispersed beverage emulsion.

In another embodiment of the present invention, the oil mixture can further comprise a suitable beverage weighting agent. In addition, the aqueous mixture can further include a preservative, a coloring agent, and an acidulant.

In yet another embodiment of the present invention, the in-line mixing comprises adjusting the in-line mixing parameters (i.e., pressure drop through the in-line mixer and flow rate) for the beverage pre-emulsion to impart sufficient mixing energy to reduce the droplet size of the oil present in the beverage pre-emulsion to a droplet size from about 1 micron to about 12 microns, preferably from about 2 microns to about 6 microns to precondition the beverage pre-emulsion.

In accordance with another aspect of the present invention, a process for dispersing an oil phase into a continuous aqueous phase is provided. The process comprises combining an oil phase and an aqueous phase to form a pre-emulsion. In-line mixing the pre-emulsion to reduce the droplet size of the oil present in the pre-emulsion to precondition the pre-emulsion. Homogenizing the pre-emulsion resulting from the in-line mixing to further reduce the droplet size of the oil present in the pre-emulsion and form a uniformly dispersed emulsion.

In another aspect of the present invention, a process for making a beverage concentrate is provided. The process comprises mixing water with a preservative, an emulsifier, and a coloring agent to form a mixture at elevated temperatures, usually in the range of from about 40° C. to about 70° C., preferably from about 50° C. to about 60° C., to form an aqueous mixture. Thereafter, the aqueous mixture can be pasteurized if required. Subsequently, the aqueous mixture is cooled to a temperature from about 10° C. to about 35° C., preferably from about 15° C. to about 25° C. The aqueous mixture is further diluted with water to form a diluted mixture to which an acidulant is added. The diluted mixture is mixed with an oil mixture comprising an oil to form a beverage concentrate. After the mixing, the beverage concentrate is diluted with water and subjected to in-line mixing and homogenizing to reduce the droplet size of the oil present in the diluted beverage concentrate to form a final beverage concentrate.

In yet another aspect of the present invention a system for making a uniformly dispersed beverage emulsion is provided. The system comprises a source of an oil mixture comprising an oil and a source of an aqueous mixture comprising a beverage emulsifier. The system further comprises an in-line mixing device for dispersing the oil mixture into the aqueous mixture to form a stable beverage pre-emulsion and a homogenizer in fluid connection with the in-line mixing device for homogenizing the stable beverage pre-emulsion to form a uniformly dispersed beverage emulsion.

In another aspect of the present invention a system for making a uniformly dispersed beverage emulsion is provided. The system comprises a source of an oil mixture comprising an oil and a source of an aqueous mixture comprising a beverage emulsifier. The system further comprises an in-line mixing system to reduce the droplet size of the oil to form a uniformly dispersed beverage emulsion.

In one embodiment of the present invention, the in-line mixing system comprises an in-line static mixing device.

In another embodiment of the present invention, the in-line static mixing system comprises a plurality of in-line mixing devices in fluid connection.

DETAILED DESCRIPTION OF THE INVENTION

According to one aspect of the present invention, a process for making oil-in-water emulsions is provided. The process comprises combining an oil component and an aqueous component to form a pre-emulsion; mixing the pre-emulsion to reduce the droplet size of the oil component and then homogenizing the pre-emulsion after the mixing to form a uniformly dispersed emulsion.

In one embodiment of the present invention, the process comprises combining an oil mixture and an aqueous mixture to form a beverage pre-emulsion, in-line mixing the beverage pre-emulsion to reduce the droplet size of the oil, and homogenizing the beverage pre-emulsion after the in-line mixing to form a uniformly dispersed beverage emulsion. The oil mixture comprises a suitable oil, which typically will be an oil having a droplet size.

In another embodiment of the present invention, the oil mixture can further comprise a suitable beverage weighting agent. Examples of suitable beverage weighting agents include, but are not limited to, ester gums, sucrose acetate isobutyrate (SAIB) and other sucrose esters, brominated vegetable oil, gum damar, colophony, gum elemi, and other beverage weighting agents known to those skilled in the art, and combinations thereof.

The term "oil" as used herein refers to a liquid which is substantially immiscible with water and forms a second phase. Examples of suitable oils include, but are not limited to, citrus oils, cola oils, essential oils, coconut oil, terpenes, water-immiscible materials used to deliver the sensory attributes of the beverage, as well as water-immiscible organic solvents for use in chemical oil-in-water emulsions, and the like, known in the art.

The invention is particularly suited for incorporating citrus oil in to beverages that may be carbonated or non-carbonated. The invention is especially useful for incorporating orange citrus oil in a carbonated beverage where the oil remains uniformly dispersed without settling or forming a "ring around the bottle," and also a uniform color and appearance is achieved.

The term "ring around the bottle" and variations thereof such as neck ringing means the agglomeration of oil droplets that float to the top of the beverage, usually at the neck of the bottle, creating the appearance of a ring formation.

The aqueous mixture comprises a suitable beverage emulsifier. Such emulsifiers are well known in the art and include, for example, gum arabic, modified starch, pectin, xanthan gum, mono-glycerides and di-glycerides of long chain fatty acids, sucrose monoesters, sorbitan esters, polyethoxylated glycerols, stearic acid, palmitic acid, mono-glycerides, di-glycerides, propylene glycol esters, lecithin, lactylated mono- and di-glycerides, propylene glycol monoesters, polyglycerol esters, diacetylated tartaric acid esters of mono- and di-glycerides, citric acid esters of monoglycerides, stearoyl-2-lactylates, polysorbates, succinylated monoglycerides, acetylated monoglycerides, ethoxylated monoglycerides, as well as other beverage emulsifiers known to those skilled in the art, and combinations thereof.

The aqueous mixture can further comprise a suitable preservative, a suitable coloring agent, and a suitable acidulant, all of which are well known in the art.

Non-limiting examples of suitable preservatives include, but are not limited to, sodium benzoate, sodium propionate, sodium sorbate, sorbic acid, potassium benzoate, potassium sorbate, as well as other preservatives known to those skilled in the art, and combinations thereof.

Non-limiting examples of suitable coloring agents include, but are not limited to, β-Apo-8'-carotenal, canthaxanthin, β-carotene, Citrus Red No. 2, FD&C Red No. 28, D&C Yellow No. 10, FD&C Blue No. 1 (Brilliant Blue), FD&C Blue No. 2, FD&C Green No. 3 (Fast Green), FD&C Red No. 3, FD&C Red No. 40 (Allura Red), FD&C Yellow No. 5 (Tartrazine), FD&C Yellow No. 6 (Sunset Yellow), ferrous gluconate, orange B, riboflavin, ultramarine blue, ultramarine green, ultramarine violet, red, caramel, as well as other coloring agents known to those skilled in the art, and combinations thereof.

Non-limiting examples of suitable acidulants include, but are not limited to, citric acid, phosphoric acid, lactic acid, tartaric acid, malic acid, fumaric acid, ascorbic acid, as well as other acidulants known to those skilled in the art, and combinations thereof.

In the present invention, the in-line mixing can be performed by in-line mixers such as static mixers, sometimes known in the art as in-line mixers or motionless mixers, rotatable in-line mixers, high-speed in-line rotor-stator mixers, and others known to those skilled in the art.

In one embodiment of the present invention, a static mixer is used to reduce the droplet size of the oil present in the beverage pre-emulsion. The static mixer is located before the homogenizer to produce a consistent and optimal pre-homogenization droplet size distribution that is predictable.

The in-line mixing comprises adjusting the flow rate of the beverage pre-emulsion into the in-line mixer to impart a sufficient mixing energy to reduce the droplet size of the oil present in the beverage pre-emulsion to precondition the beverage pre-emulsion.

The term in-line mixer as used herein means a conduit with mixing elements housed within the conduit which force the fluid media to mix and create high energy dissipation rates which result in the creation of fine emulsions. The mixing elements can be either stationary, movable, or a combination thereof. In-line mixers come in various sizes and geometries and are commercially available from Chemineer Inc., Sulzer Chemtech Ltd, a member of the Sulzer Corp., Charles Ross & Son Co., Silverson Machines Ltd., IKA® Works Inc., Autocon Mixing Systems Inc., and others as is known in the art.

Those skilled in the art will appreciate that the number of mixing elements in a in-line mixing device can be varied and may include one mixing element or a plurality of mixing elements. Furthermore, the number of mixing elements can all be located in a single in-line mixing device or can be distributed among several in-line mixing devices.

Unexpectedly, modifying a double-pass homogenization process by adding an in-line mixer in place of the first homogenization pass converts the process to a single-pass homogenization process that imparts beneficial and improved properties to the beverage components that are being so processed. In addition, as a result of the conversion to a single-pass homogenization process, the operational cycle time required to produce a batch of an oil-in-water beverage emulsion is shortened significantly. Typically, it takes about 2.5 hours to complete a single pass through a homogenization process. Thus, eliminating one pass through a homogenization process shortens the operational cycle time by about 2.5 hours. Those skilled in the art will appreciate that the operational cycle time is product dependent, and therefore, the reduction in operational cycle time will be determined by the product and the batch size. In addition to this unexpected result, the quality of the resulting beverage emulsion is improved substantially and the robustness of the resulting beverage emulsion is likewise increased substantially.

The terms droplet size used herein refers to the size of the oil component in a liquid-liquid system. However, those skilled in the art will appreciate that other terms such as "particle size" can be used to refer to the size of an oil component in a liquid-liquid system.

The term "having a droplet size" as used herein refers to having droplets each with varying droplet sizes and whose droplet size is too large to form a stable and uniformly dispersed oil-in-water emulsion without droplet size reduction processing such as in-line mixing and/or homogenizing. Those skilled in the art will appreciate that oils do not have "a droplet size," but rather, oils are described in terms of mean droplet size and droplet size distribution.

In the present invention, the oil present in the beverage pre-emulsion prior to the in-line mixing has a droplet size distribution which varies significantly. In some instances, the droplet size distribution can range from about 30 microns to about 300 microns wherein the distribution corresponds to 90% distribution.

The droplet size reduction achieved by the in-line mixing, the pre-homogenization droplet size, is sufficient to produce a uniformly dispersed beverage emulsion in one pass through a two stage APV Homogenizer with 2,500 gallons per hour capacity and 5,000 psi maximum pressure. Typically, the pre-homogenization droplet size has a mean of from about 1 micron to about 12 microns, preferably from about 2 microns to about 6 microns.

Further, in the present invention, the optimal pre-homogenization droplet size distribution is from about 0.05 microns to about 18 microns, preferably from about 0.10 microns to about 8 microns wherein the distribution corresponds to a 90% distribution.

Those skilled in the art will appreciate that the mean pre-homogenization droplet size and the optimal pre-homogenization droplet size distribution can be product specific.

The phrase "to precondition" as it relates to the beverage pre-emulsion and as used herein means that the droplet size of the oil in the beverage pre-emulsion is reduced substantially to improve the homogenization efficiency.

The term "pre-homogenization droplet size" as used herein means the droplet size of the oil present in the beverage pre-emulsion after the in-line mixing and prior to the homogenizing.

The amount of mixing energy imparted to the beverage pre-emulsion is a function of several factors. While not wishing to be bound by theory, in general the mixing energy that is dissipated in the in-line mixer is proportional to the pressure drop through the in-line mixer and the volumetric flow rate. In addition, other factors like the design and configuration of the in-line mixer and the properties of the beverage pre-emulsion such as viscosity, density, and interfacial tension, will affect the amount of mixing energy required to achieve a desired droplet size.

In the present invention, the homogenizing further reduces the droplet size of the oil present in the beverage pre-emulsion to form a uniformly dispersed beverage emulsion. The droplet size has a mean of from about 0.2 microns to about 0.8 microns, preferably from about 0.25 microns to about 0.60 microns. The droplet size distribution is from about 0.05 microns to about 1.1 microns, preferably from about 0.20 microns to about 0.65 microns wherein the distribution corresponds to a 90% distribution.

Homogenizing technologies available to reduce the droplet size and to uniformly disperse the oil include, but are not limited to, high-pressure homogenizing, high shear mixing, sonicating, and other mixing techniques known to those skilled in the art.

In accordance with another aspect of the present invention, a process for dispersing an oil phase into a continuous aqueous phase is provided. The process comprises combining an oil phase and an aqueous phase to form a pre-emulsion. In-line mixing the pre-emulsion to reduce the droplet size of the oil present in the pre-emulsion to precondition the pre-emulsion. Homogenizing the pre-emulsion resulting from the in-line mixing to further reduce the droplet size of the oil present in the pre-emulsion and form a uniformly dispersed emulsion.

In yet another embodiment of the present invention, a process for making a beverage concentrate is provided. The process comprises mixing water with a preservative, an emulsifier, and a coloring agent to form a mixture at elevated temperatures, usually in the range of from about 40° C. to about 70° C., preferably from about 50° C. to about 60° C., to form an aqueous mixture. Preferably, the water is at an elevated temperature prior to adding the other components. Thereafter, the aqueous mixture can be pasteurized if required. Subsequently, the aqueous mixture is cooled to a temperature from about 10° C. to about 35° C., preferably from about 15° C. to about 25° C. The aqueous mixture is further diluted with water to form a diluted mixture to which an acidulant is added. The diluted mixture is mixed with a weighted oil mixture comprising a suitable beverage weighting agent and an oil to form a beverage concentrate. After the mixing, the beverage concentrate is diluted with water and subjected to in-line mixing and homogenizing to reduce the droplet size of the oil present in the diluted beverage concentrate to form a final beverage concentrate.

The pasteurization can be done by pasteurizing technologies known in the art. Typically, pasteurization is accomplished by increasing the temperature of the beverage concentrate to a suitable temperature for a limited time to substantially eliminate the microbial load in the beverage concentrate. Typically, the higher the temperature, the shorter the amount of time the beverage concentrate is held at that temperature. Conversely, the lower the temperature, the longer the amount of time the beverage concentrate is held at that temperature. The term microbial load as used herein refers to unwanted microorganisms and unwanted enzymes present in the beverage concentrate. Thus, those skilled in the art will appreciate that not all beverage concentrates require pasteurization since not all beverage concentrates have unwanted microorganisms or unwanted enzymes.

Figure 1:
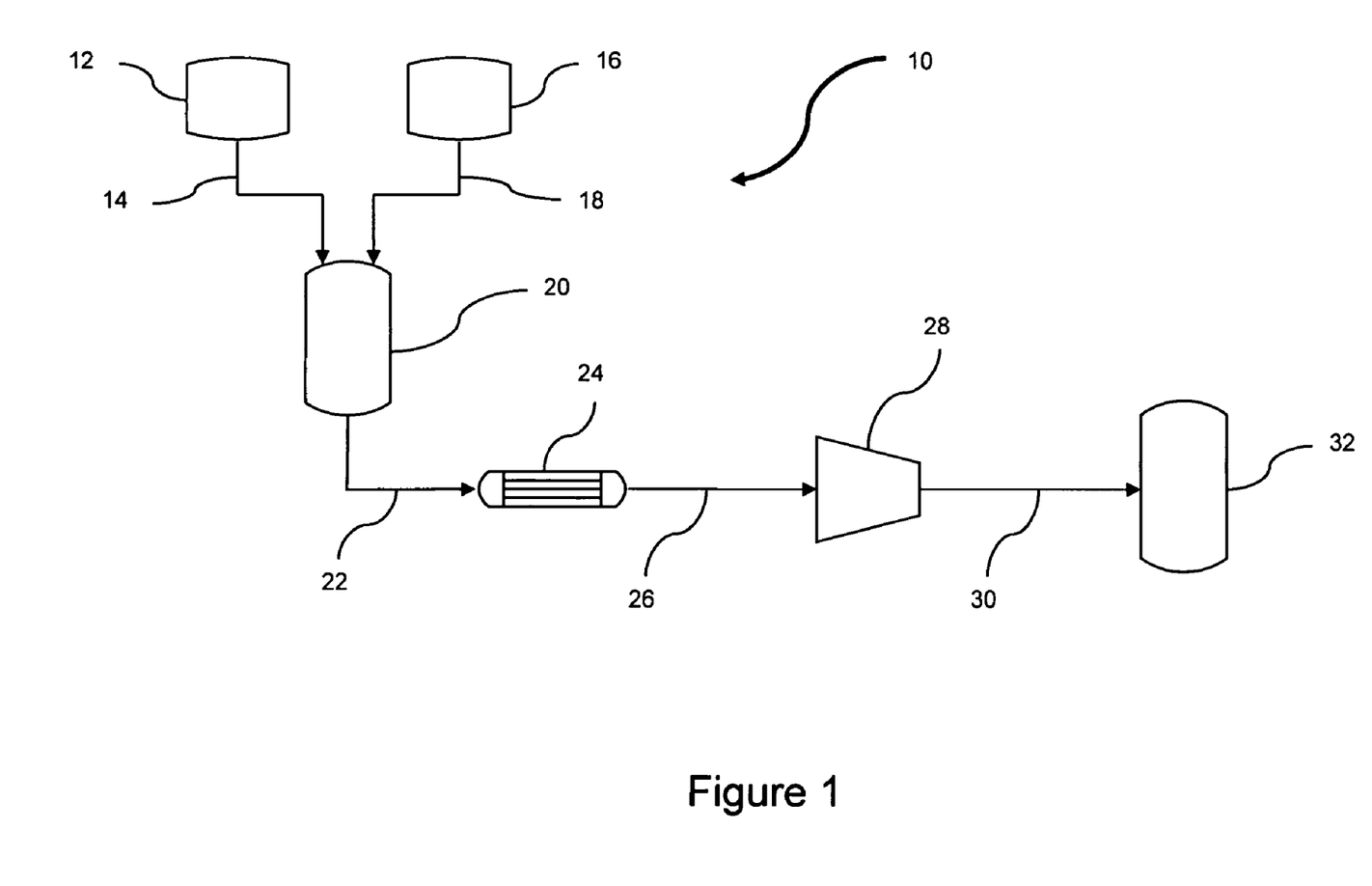
FIG. 1 is a schematic design illustrating a system in accordance with the present invention for making a uniformly dispersed beverage emulsion.

Referring now to the drawings, FIGS. 1 through 5 are provided to illustrate embodiments of the present invention and not for the purpose of limiting the same. FIG. 1 is a schematic design illustrating a system in accordance with the present invention for making a stable beverage emulsion. A system 10 is provided to manufacture a stable beverage emulsion. A suitable source 12 of an oil mixture is supplied via a suitable conduit 14 to a suitable tank 20. A suitable source 16 of an aqueous mixture is supplied via a suitable conduit 18 to tank 20. The oil mixture and the aqueous mixture are mixed in tank 20 to form a beverage pre-emulsion. A stream 22 of the beverage pre-emulsion is pumped into an in-line mixer 24 to form a stable beverage pre-emulsion. A stream 26 of the stable beverage pre-emulsion is pumped into a homogenizer 28 to form a uniformly dispersed beverage emulsion. A stream 30 of the uniformly dispersed beverage emulsion is pumped into a tank 32 to be filled into containers.

Figure 2:
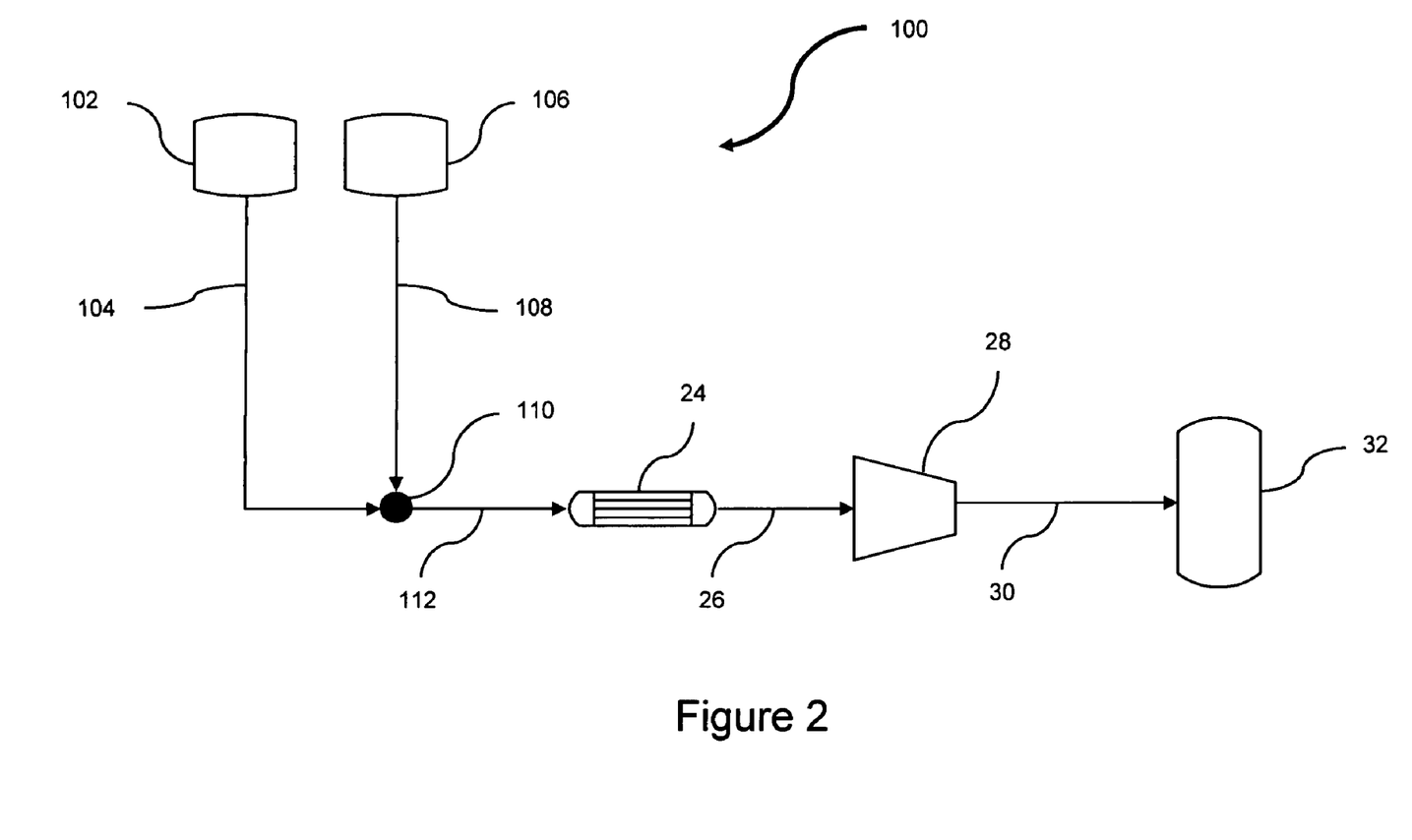
FIG. 2 is a schematic design illustrating another system in accordance with the present invention for making a uniformly dispersed beverage emulsion.

FIG. 2 is a schematic design illustrating another system in accordance with the present invention for making a uniformly dispersed beverage emulsion. A system 100 is provided to manufacture a uniformly dispersed beverage emulsion. A suitable source 102 of an oil mixture is combined via a suitable conduit 104 with a suitable source 106 of an aqueous mixture via a suitable conduit 108 at a point 110 to form a beverage pre-emulsion. A stream 112 of the beverage pre-emulsion is pumped into in-line mixer 24 to form a stable beverage pre-emulsion. The process downstream of stream 112 in FIG. 2 is the same as the process described for the schematic of FIG. 1 starting at in-line mixer 24 in FIG. 1.

Figure 3:
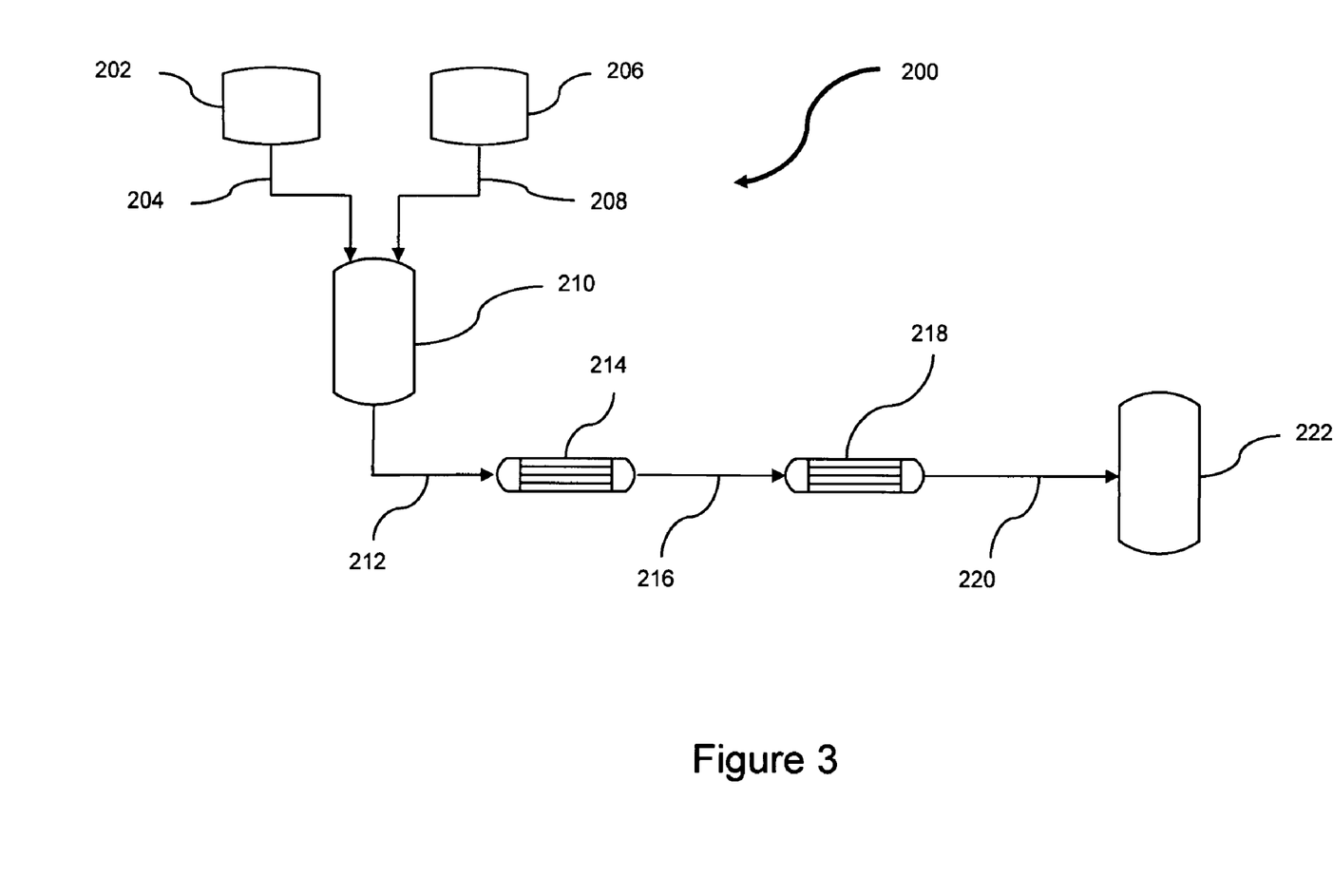
FIG. 3 is a schematic design illustrating another system in accordance with the present invention for making a uniformly dispersed beverage emulsion.

FIG. 3 is a schematic design illustrating another system in accordance with the present invention for making a uniformly dispersed beverage emulsion. A system 200 is provided to manufacture a uniformly dispersed beverage emulsion. A suitable source 202 of an oil mixture is supplied via a suitable conduit 204 to a suitable tank 210. A suitable source 206 of an aqueous mixture is supplied via a suitable conduit 208 to tank 210. The oil mixture and the aqueous mixture are mixed in tank 210 to form a beverage pre-emulsion. A stream 212 of the beverage pre-emulsion is pumped into a first in-line mixer 214 to form a stable beverage pre-emulsion. A stream 216 of the stable beverage pre-emulsion is pumped into a second in-line mixer 218 to form a uniformly dispersed beverage emulsion. A stream 220 of the uniformly dispersed beverage emulsion is pumped into a tank 222 to be filled into containers.

Figure 4:
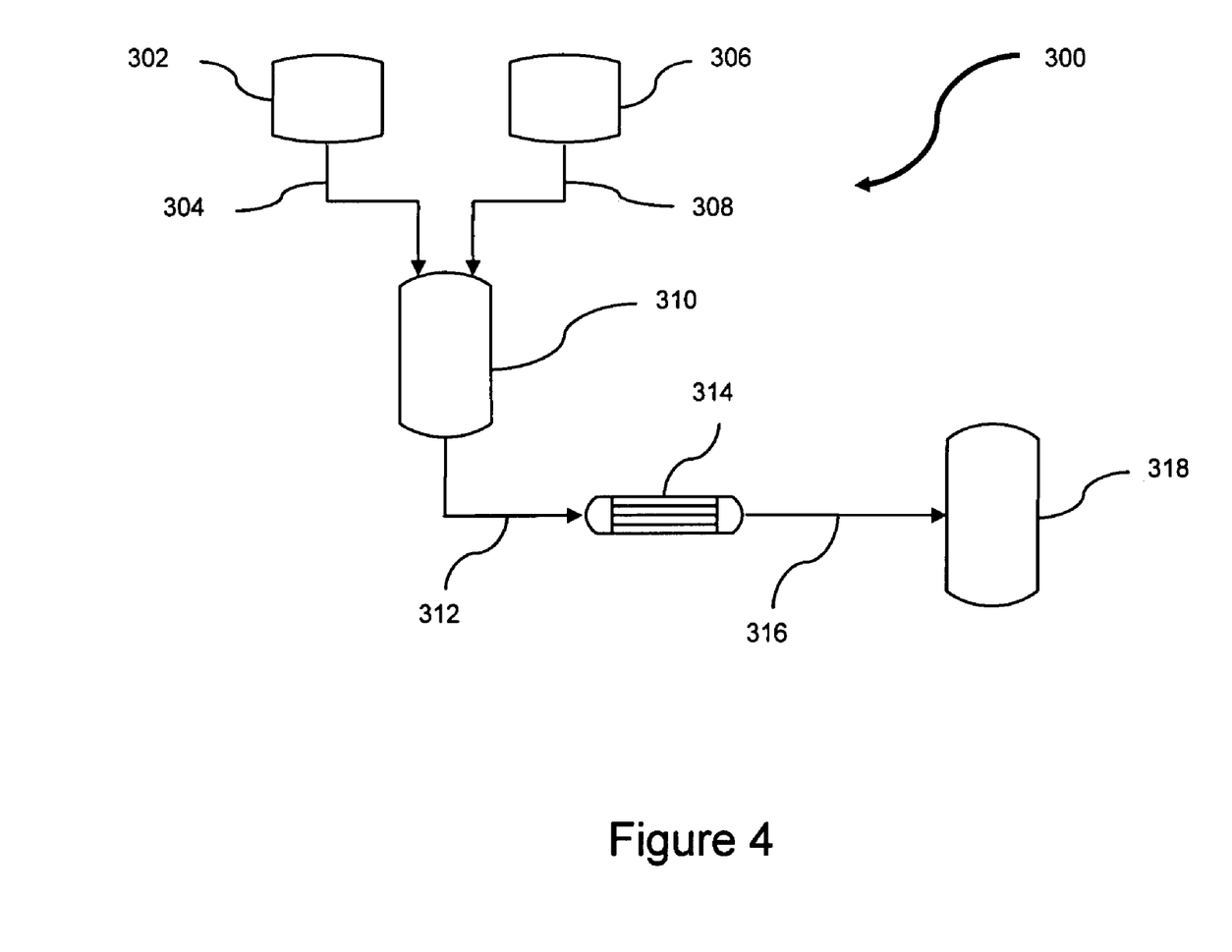
FIG. 4 is a schematic design illustrating another system in accordance with the present invention for making a uniformly dispersed beverage emulsion.

FIG. 4 is a schematic design illustrating another system in accordance with the present invention for making a uniformly dispersed beverage emulsion. A system 300 is provided to manufacture a uniformly dispersed beverage emulsion. A suitable source 302 of an oil mixture is supplied via a suitable conduit 304 to a suitable tank 310. A suitable source 306 of an aqueous mixture is supplied via a suitable conduit 308 to tank 310. The oil mixture and the aqueous mixture are mixed in tank 310 to form a beverage pre-emulsion. A stream 312 of the beverage pre-emulsion is pumped into an in-line mixer 314 to form a uniformly dispersed beverage emulsion. A stream 316 of the uniformly dispersed beverage emulsion is pumped into a tank 318 to be filled into containers.

Figure 5:
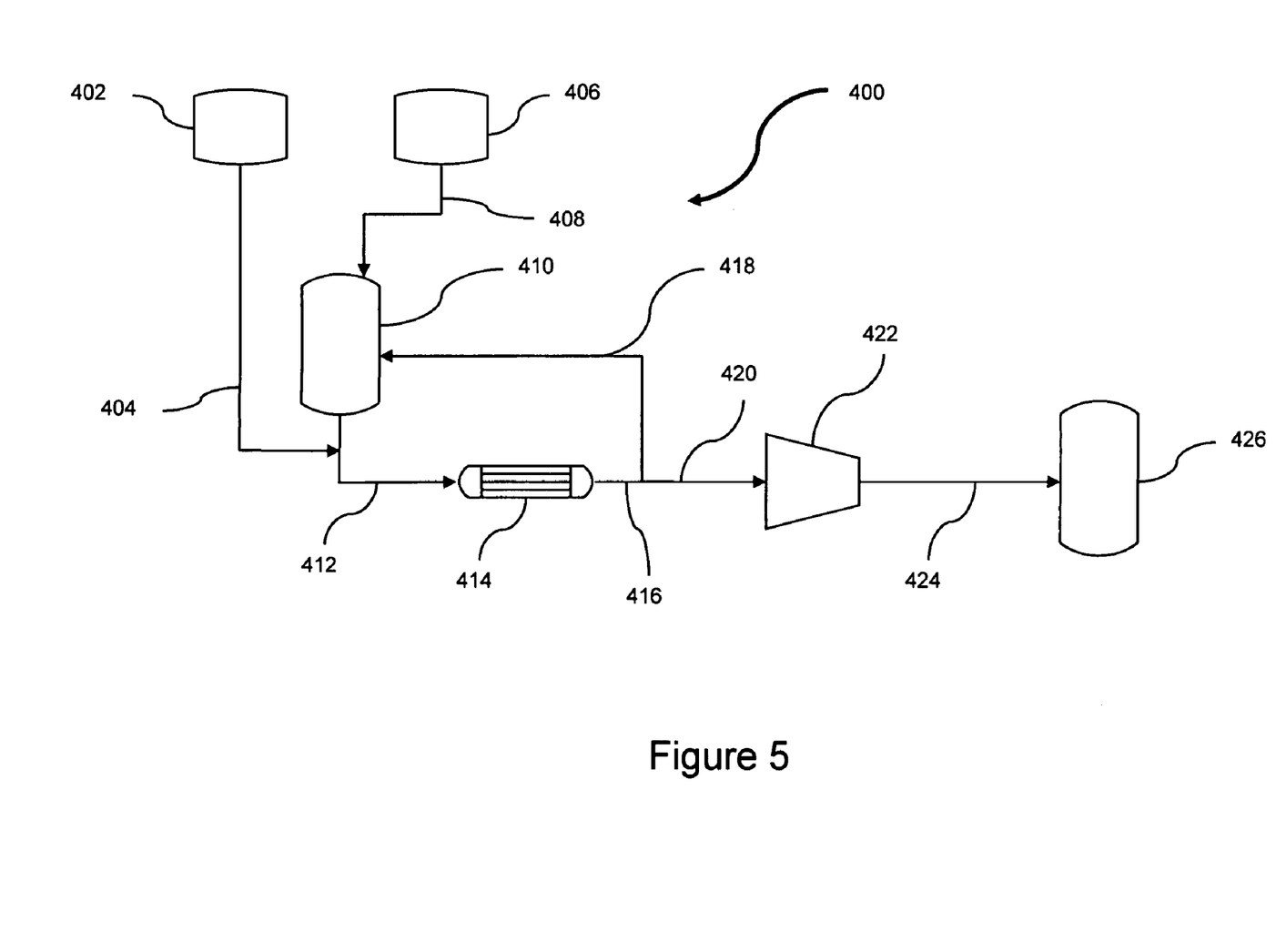
FIG. 5 is a schematic design illustrating another system in accordance with the present invention for making a uniformly dispersed beverage emulsion.

FIG. 5 is a schematic design illustrating a system in accordance with the present invention for making a stable beverage emulsion. A system 400 is provided to manufacture a stable beverage emulsion. A suitable source 402 of an oil mixture is supplied via a suitable conduit 404 to a stream 412. A suitable source 406 of an aqueous mixture is supplied via a suitable conduit 408 to a suitable tank 410. The oil mixture and the aqueous mixture are mixed in an in-line mixer 414 to form a beverage pre-emulsion. A stream 416 of the beverage pre-emulsion is looped back to tank 410 via a suitable conduit 418 until all of oil-mixture 402 is mixed with aqueous mixture 406 in in-line mixer 414. Thereafter, stream 416 of the beverage pre-emulsion is pumped into a homogenizer 422 via a suitable conduit 420 to form a uniformly dispersed beverage emulsion. A stream 424 of the uniformly dispersed beverage emulsion is pumped into a tank 426 to be filled into containers.

Although the invention has been described in detail for use in preparing beverage emulsions, it should be recognized that the process can also be used to prepare other oil-in-water emulsions, including chemical emulsions. Such chemical emulsions include paints, and other pigment-containing oil-in-water emulsions, inks, and varnishes. Chemical oil-in-water emulsions also include compositions which provide oil- and/or water-repellency and/or stain and soil release and/or resistance to surfaces.

EXAMPLE

A pre-emulsion was held in a Homogenizer Feed Tank and mixed with an agitator to prevent the two phases from separating. Ninety percent (90%) of the droplets in the tank were less than 27 microns in size after 70 minutes of mixing. This pre-emulsion was fed through a Chemineer-Kenics static mixer with an internal diameter of 0.87 inches and with six mixing elements installed to form an emulsion. The flow rate of the pre-emulsion was 45 gallons per minute (GPM) and the pressure drop across the mixer was 82 psi. Ninety percent (90%) of the droplets exiting the static mixer were less than 8.0 microns in size. This emulsion was then fed directly to the homogenizer where the droplet size was further reduced such that 90% of the droplets exiting were less than 0.57 microns in size.

While the invention has been described with respect to certain preferred embodiments, as will be appreciated by those skilled in the art, it is to be understood that the invention is capable of numerous changes, modifications and rearrangements and such changes, modifications and rearrangements are intended to be covered by the following claims.

The invention claimed is:

1. A continuous process for making a stable oil-in-water emulsion bottled beverage, said process comprising:
   combining an oil mixture and an aqueous mixture to form a beverage pre-emulsion, said oil mixture comprising an oil having a droplet size of about 30 microns to about 300 microns, and said aqueous mixture comprising a beverage emulsifier;
   continuously pumping a stream of the beverage pre-emulsion into an in-line static mixer;
   adjusting the flow rate of the beverage pre-emulsion stream to impart sufficient mixing energy to reduce the mean droplet size of the oil present in the beverage pre-emulsion to from about 1 micron to about 12 microns to precondition the beverage pre-emulsion;
   homogenizing the preconditioned beverage pre-emulsion in a single pass to form a uniformly dispersed beverage emulsion having a mean particle size of from about 0.2 microns to about 0.8 microns; and
   adding the uniformly dispersed beverage emulsion to a bottle having a neck, wherein the beverage emulsion does not exhibit ringing or floc in the neck of the bottle.

2. The process of claim 1 wherein the in-line mixing reduces the mean of the droplet size of the oil present in the beverage pre-emulsion to from about 2 micron to about 6 microns.

3. The process according to claim 1 wherein the beverage emulsifier is selected from the group consisting of gum arabic, modified starch, pectin, xanthan gum, sucrose monoesters, sorbitan esters, polysorbates, mono-glycerides, di-glycerides, propylene glycol esters, and combinations thereof.

4. The process according to claim 1 wherein the oil mixture further comprises a weighting agent selected from the group consisting of ester gums, sucrose acetate isobutyrate, brominated vegetable oil, gum damar, colophony, gum elemi, and combinations thereof.

5. The process according to claim 1 wherein the oil is selected from the group consisting of citrus oils, cola oils, essential oils, coconut oil, terpenes, and combinations thereof.

6. The process of claim 1 wherein said aqueous mixture further comprises a preservative, a coloring agent, and an acidulant.

7. The process according to claim 6 wherein the preservative is selected from the group consisting of sodium benzoate, sodium propionate, sodium sorbate, sorbic acid, potassium benzoate, potassium sorbate, and combinations thereof.

8. The process according to claim 6 wherein the coloring agent is selected from the group consisting of β-Apo-8'-carotenal, canthaxanthin, β-carotene, Citrus Red No. 2, FD&C Red No. 28, D&C Yellow No. 10, FD&C Blue No. 1, FD&C Blue No. 2, FD&C Green No. 3, FD&C Red No. 3, FD&C Red No. 40, FD&C Yellow No. 5, FD&C Yellow No. 6, ferrous gluconate, orange B, riboflavin, ultramarine blue, ultramarine green, ultramarine violet, red, caramel, and combinations thereof.

9. The process according to claim 6 wherein the acidulant is selected from the group consisting of citric acid, phosphoric acid, lactic acid, tartaric acid, malic acid, fumaric acid, ascorbic acid, and combinations thereof.

10. A continuous process for making a stable oil-in-water emulsion bottled beverage, said process comprising:

combining an oil mixture and an aqueous mixture to form a beverage pre-emulsion, said oil mixture comprising an oil having a droplet size of about 30 microns to about 300 microns, and said aqueous mixture comprising a beverage emulsifier; and continuously pumping a stream of the beverage pre-emulsion into an in-line static mixer;

adjusting the flow rate of the beverage pre-emulsion stream to impart sufficient mixing energy to reduce the mean droplet size of the oil present in the beverage pre-emulsion to from about 1 micron to about 12 microns to precondition the beverage pre-emulsion;

pumping the stream of the preconditioned beverage pre-emulsion into a second in-line mixing to form a uniformly dispersed beverage emulsion to form a uniformly dispersed beverage emulsion having a mean particle size of from about 0.2 microns to about 0.8 microns; and adding the uniformly dispersed beverage emulsion to a bottle having a neck, wherein the beverage emulsion does not exhibit ringing or floc in the neck of the bottle.

* * * * *